United States Patent [19]

Misawa

[11] Patent Number: 5,369,230
[45] Date of Patent: Nov. 29, 1994

[54] SWITCH APPARATUS

[75] Inventor: Masayuki Misawa, Tokyo, Japan

[73] Assignee: Asahi Kogaku Kogyo Kabushiki Kaisha, Tokyo, Japan

[21] Appl. No.: 942,405

[22] Filed: Sep. 9, 1992

[30] Foreign Application Priority Data

Sep. 13, 1991 [JP] Japan .................. 3-96350[U]

[51] Int. Cl.$^5$ .......................... H01H 9/00; G03B 7/00
[52] U.S. Cl. ........................... 200/52 R; 200/4;
 200/11 G; 200/11 R; 354/486; 354/289.1
[58] Field of Search ............... 200/4, 5 R, 5 A, 11 R,
 200/11 DA, 11 G, 11 J, 11 K, 314, 316, 329, 52
 R; 354/442, 289.1, 266, 354, 486

[56] References Cited

U.S. PATENT DOCUMENTS

| | | | |
|---|---|---|---|
| 3,030,460 | 4/1962 | Huetten et al. | 200/11 G |
| 3,648,581 | 3/1972 | Umemura | 354/266 |
| 3,736,390 | 5/1973 | Lockard | 200/11 DA |
| 3,932,176 | 4/1976 | Holder et al. | 200/11 R |
| 3,952,176 | 4/1976 | Holder et al. | 200/11 R |
| 3,956,763 | 5/1976 | Yamanaka | 354/289.1 |
| 4,118,716 | 10/1978 | Suzuki et al. | 354/442 |
| 4,253,756 | 3/1981 | Kurei et al. | 354/289.1 |
| 4,394,546 | 7/1983 | Harumatsu | 200/5 R |
| 4,497,564 | 2/1985 | Meguro et al. | 354/442 |
| 4,866,219 | 9/1989 | Riding et al. | 200/4 |
| 5,180,050 | 1/1993 | Rada et al. | 200/329 |

FOREIGN PATENT DOCUMENTS

| | | |
|---|---|---|
| 0160905 | 11/1985 | European Pat. Off. . |
| 0176817 | 4/1986 | European Pat. Off. . |
| 0282817 | 9/1988 | European Pat. Off. . |
| 3401247 | 7/1985 | Germany . |
| 220962 | 5/1925 | United Kingdom . |
| 424948 | 3/1935 | United Kingdom . |
| 523242 | 7/1940 | United Kingdom . |
| 743838 | 1/1956 | United Kingdom . |
| 977130 | 12/1964 | United Kingdom . |

OTHER PUBLICATIONS

French Search Report and Annex.

Primary Examiner—J. R. Scott
Attorney, Agent, or Firm—Sandler Greenblum & Bernstein

[57] ABSTRACT

A switch apparatus for use with a device. The switch apparatus includes a letter ring, associated with an operation member, that rotates together with a selection dial. The letter ring contains inscriptions, such as marks or figures thereon. A decorative plate includes a pointer to indicate the selected function. A rotation of the rotatable operation member causes a plurality of electrical conductors to change their ON/OFF electrical state. The plurality of electrical conductors form a code pattern representing a code that is interpreted by a control circuit to determine an operation mode selected by the rotational operation member. The switch apparatus further includes a push button that is depressed to, for example, activate a modification of the operation mode based upon the data of the code pattern of the code.

20 Claims, 2 Drawing Sheets

SWITCH APPARATUS

BACKGROUND OF THE INVENTION

1. Field of the Invention

The present invention relates to a switch apparatus which is actuated to modify or select various function modes or data in a camera or the like.

2. Description of Related Art

In a recent camera having various functions, it is necessary to provide many switches corresponding to the functions. However, a large number of switches provided on a camera body complicate the camera and require a large space, making it difficult to realize a compact camera which can be easily handled.

SUMMARY OF THE INVENTION

The primary object of the present invention is to provide a switch apparatus which will allow for the realization of a compact, multi-function camera having increased freedom of design and improved operability.

To achieve the object mentioned above, according to the present invention, a switch apparatus is provided having an indicating member which is external to a device employing the switch apparatus. The indicating member is rotatably mounted to an external member, which is shaped to form a part of an external contour of the device, and has a push button inserted therein. A rotatable operating member has an operating portion which is external to the device.

Preferably, a group of contacts are provided to be selectively turned ON and OFF in accordance with the rotatable operating member, and a contact member is provided which is actuated by the push button.

The present disclosure relates to subject matter contained in Japanese utility model application No. 03-96350 (filed on Sep. 13, 1991) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
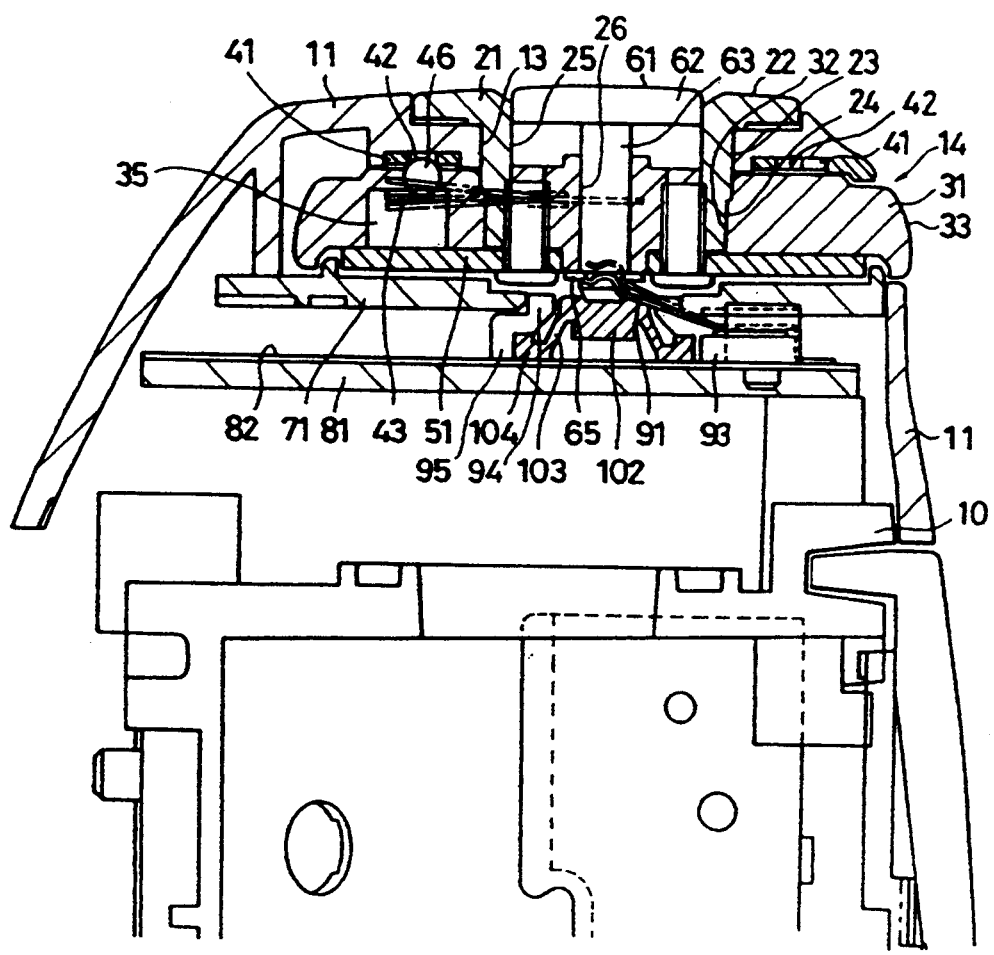
FIG. 1 is a sectional view of a main part of a camera having a switch apparatus incorporated therein, according to the present invention; and, FIG. 2 is an exploded perspective view of a switch apparatus according to the present invention.
Figure 2:
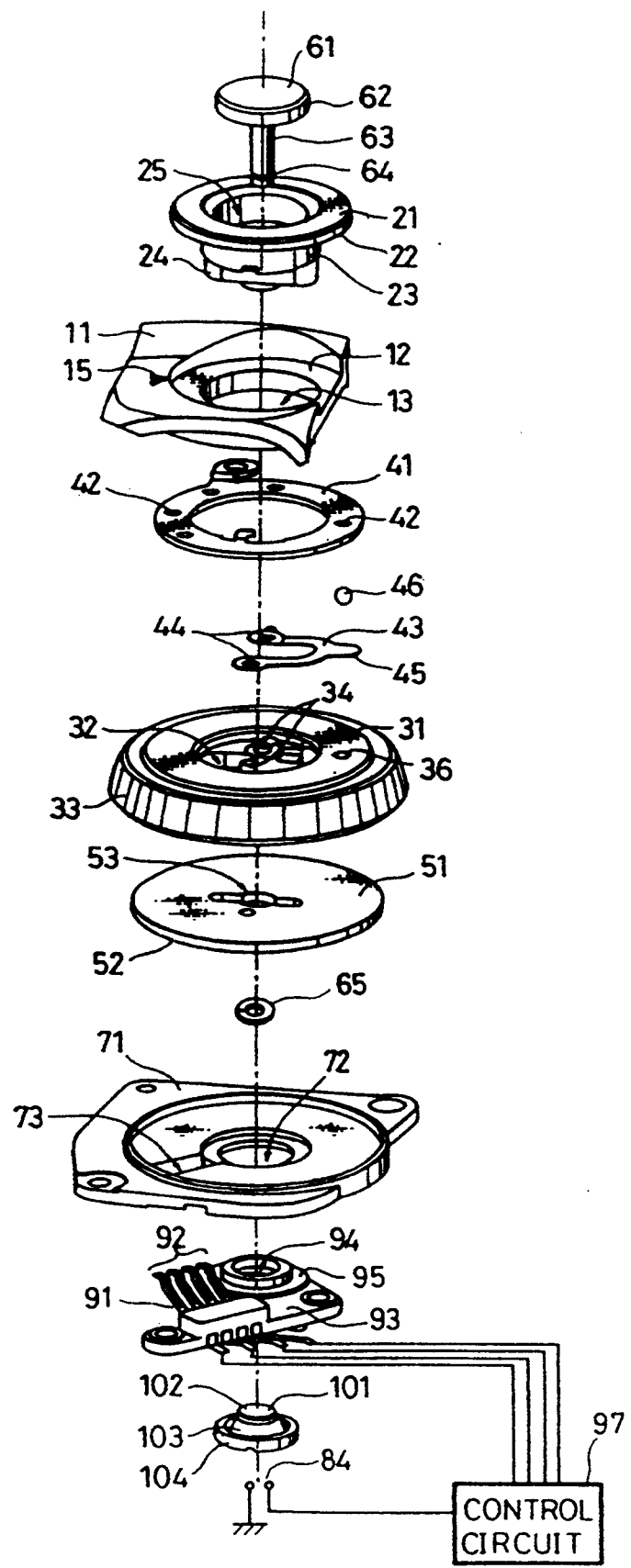

As shown in FIGS. 1 and 2, a decorative plate (outer member) 11 which forms a top of a camera body 10 is provided on an outer surface thereof with a recess 12 in which a letter ring (indication member) 21 is rotatably received. A center opening 13 is formed in the bottom of the recess 12.

The letter ring 21 has an annular body 22 and a hollow shaft portion 23 which projects downward from a lower surface of the annular body 22. The annular body 22 is rotatably fitted in the recess 12 and the shaft portion 23 is rotatably inserted in the center opening 13. The annular body 22 has letters, figures, or marks formed on an upper surface thereof to represent necessary information.

A selection dial (rotatable operation member) 31 is fitted to the hollow shaft portion 23 of the letter ring 21 from a lower surface side of the recess 12 (i.e., from the inside of the camera body). The letter ring 21 and the selection dial 31 are interconnected by a non-circular detent 24, formed at front end of the hollow shaft portion 23, and an elongated hole 32, formed at the center of the selection dial 31, in which the non-circular detent 24 is fitted.

Camera body 10 (i.e., the decorative plate 11) is provided on a side surface thereof with an operation window 14 through which a finger abutment (operation member) 33, formed on an outer peripheral surface of the selection dial 31, projects out of the camera.

A click stop ring 41 is secured to the lower surface of the recess 12 to be opposed to the selection dial 31. A slight clearance exists between the click stop ring 41 and the upper surface of the selection dial 31. The click stop ring 41 is provided with a plurality of click stop holes 42, spaced from one another at a predetermined distance along an imaginary circle. The selection dial 31 has a click ball hole 36 which is located on an imaginary circle having the same center and radius as those of the imaginary circle defined by the click stop holes 42.

Selection dial 31 has a generally Y-shaped click spring 43 secured thereto, which is provided with bifurcated arms, each having a hole 44 formed in a front end thereof. A pair of projections 34, provided on the edges of the elongated hole 32 of the selection dial 31, are fit in the corresponding holes 44 of the click spring 43. Web portion 45 of the click spring 43 is located in a hole 35 which is formed in the selection dial 31 to extend outward from the elongated hole 32.

A click ball 46 is received in the click ball hole 36 which is located above the hole 35. The click ball 46 is elastically biased by the web portion 45 of the click spring 43 in an upward manner towards the click stop ring 41. Consequently, when the click stop hole 42 is registered with the click ball hole 36, the click ball 46 fits in the click stop hole 42 and the click ball hole 36, so that the selection dial 31 is click stopped with respect to the click stop ring 41 and, accordingly, the camera body 10. The click ball hole 36, the click stop ring 41, the click stop hole 42 and the click ball 46 constitute a click stop mechanism.

A circular code plate 51 is secured to the lower surface of the selection dial 31. The code plate 51 is made of an insulation material and has a code 52 formed on a lower surface thereof to represent predetermined data. The code 52 is made of a concentric annular pattern of conductors. The code 52 has wide conductive land portions which come into contact with contact pieces 92 of a brush 91, to be discussed below, and narrow non-conductive portions which do not contact the contact pieces 92. The code 52 and the brush 91, in combination, provide data representing the click stop position of the selection dial 31.

A dust cover 71 is secured to the decorative plate 11 beneath the circular code plate 51. Dust cover 71 has a center hole 72 and a brush hole 73 radially and outwardly extending from the center hole 72.

As shown in FIG. 1, a mother plate 81 secured to the camera body 10 is provided below the code plate 51. The mother plate 81 has a flexible printed circuit board 82 (referred to hereinafter as an FPC board) secured to the upper surface thereof. The brush 91 is provided on the FPC board 82 and has the four contact pieces 92 provided on a substrate 93 made of an insulation material. The contact pieces 92 extend through the brush hole 73 of the dust cover 71 to come into sliding contact with the codes 52 at the front ends of the contact pieces.

The contact pieces 92 can be independently and selectively brought into sliding contact with, the conductive land portions of the code 52. The contact pieces 92 are either in contact with, or not in contact with, the conductive land portions of the code 52, thereby producing one bit data. Bit data of the code 52 in combination (i.e., contact arrangement between contact pieces 92 and conductive land portions of the code pattern 52) provide four-bit data. The contact pieces 92 are electrically connected to a control circuit or controller 97 (e.g., microcomputer) provided in the camera body 10, so that the four-bit data is detected by the controller 97 to perform a predetermined operation in accordance with the detected data. The number of bits is not limited to four and may be two or eight, for example.

As shown in FIG. 2, substrate 93 has a cylindrical portion 94 which is fitted in the hole 72 of the dust cover 71. The cylindrical portion 94 is provided on a base portion thereof with a large diameter flange portion 95. An electrically conductive rubber switch (member) 101, which is generally "A-shaped" in cross-section, is housed in the cylindrical portion 94. The rubber switch 101 includes a contact post 102 on the center portion thereof, an annular base portion 104, and a support 103. The base portion 104 is held between the FPC board 82 and the flange portion 95. The contact post 102 is fitted in the cylindrical portion 94.

A push button 61 is inserted in the letter ring 21 from the outside of camera body 10. The push button 61 has a large diameter head 62 and a small diameter shaft 63. The head portion 62 is inserted in a shaft hole 25 of the letter ring 21 to move in an axial direction. The shaft portion 63 is slidably inserted in a shaft hole 26 formed at the center of the non-circular detent 24 provided on the front end of the hollow shaft 23. The front end of the shaft portion 63 extends through the shaft hole 26 and a center hole 53 of the code plate 51, and comes into the cylindrical portion 94 to bear against the upper surface of the contact post 102 of the conductive rubber switch 101. Consequently, the push button 61 is elastically biased to project outwardly by the elastic force of the support 103. A C-ring 65 is fitted in a groove 64, formed in the portion of the shaft portion 63 that projects from the hole 53, to prevent the shaft portion 63 from coming out of the hole 53 and the shaft hole 26.

When the push button 61 is manually depressed by a photographer, the contact post 102 is moved down to elastically deform the support 103, so that the lower surface of the contact post 102 comes into contact with the FPC board 82. The FPC board 82, with which the contact post 102 contacts, has at least one pair of contacts 84 electrically connected to the controller 97. Consequently, the contacts 84 are interconnected (i.e., turned ON) by the depressing of the contact post 102. When the push button 61 is released, the contact post 102 is automatically returned to its the initial position by the elastic restoring force of the support 103. Namely, the contacts 84 are disconnected from one another and the push button 61 is returned to the initial position.

The switch apparatus as constructed above operates as follows.

Letter ring 21 rotates together with the selection dial 31. The letter ring 21 has inscribed thereon, marks or figures, etc., representing various functions which may be selected by the selection dial 31. The decorative plate 11 has a pointer (mark) 15 formed on the upper surface thereof to indicate the selected function, and, accordingly, the click stop position of the selection dial 31.

When a photographer exerts an external rotational force above a predetermined value onto the finger abutment (operation member) 33 in a predetermined direction, the click ball 46 comes out of the click stop hole 42. Accordingly, resistance against rotation, resulting from the engagement of the click ball with the click stop hole, is reduced. The selection dial 31 may then be rotated with a small force.

When another click stop hole 42 is registered with the click ball 46 during the rotation of the selection dial 31, the click ball 46 is engaged in that click stop hole 42 to click stop the selection dial 31. At the click stop position, the contact pieces 92 come into contact with the predetermined conductor land portions of the code 52 to issue ON/OFF signals, corresponding to the combination thereof. The signals are sent to the controller 97, which detects predetermined data in accordance therewith, to perform the necessary operations. The data corresponds to the inscription on the letter ring 21 towards which the mark 15 is pointing.

When the photographer depresses push button 61, the contact post 102 establishes an electrical connection with the contacts 84 of the FPC board 82. Accordingly, the controller 97 activates, for example, the modification of operation modes or set values, etc., of the camera, based on the data of the code pattern of the code 52, which is generated by the contact state of contact pieces 92, i.e., the angular position of the letter ring 21. In this state, if another switch mechanism (not shown) is actuated, the activated modes are selected or the set values are modified. The modes or parameters to be selected or modified by the conductive code pattern of the code 52 can be optionally set.

When the selection dial 31 is rotated or the push button 61 is again depressed in the activated position, the setting operation is initialized.

As can be understood from the above discussion, according to the present invention, the letter ring 21 is provided on the decorative plate 11, the selection dial 31 is provided in the decorative plate 11, the operation member 33, of the selection dial 31, is exposed at the side surface of the decorative plate 11, and the push button 61 is provided on the center axis of the letter ring 21 and the selection ring 31, resulting in a small and simple compound switch apparatus which can be easily incorporated in a compact camera, without having an adverse effect on the appearance of the camera. To incorporate the switch apparatus of the invention in an existing camera, few design modification of the camera are necessary.

Although the above-mentioned embodiment has been directed to a camera, the present invention is not limited thereto. For instance, the present invention can be generically applied to optical equipment or electric equipment having electronic elements incorporated therein.

If the switch apparatus of the present invention is incorporated in a camera, it is possible for a photographer to manually rotate the selection dial 31 to thereby select, for example, a desired operation mode. Furthermore, when the photographer depresses the push button 61 provided at the center of the selection dial 31, a desired operation mode, for example, can be selected.

Although the inscribed marks, letters, or figures (indication marks) are provided on the letter ring 21, and the pointer (mark) 15 is provided on the decorative plate 11, in the illustrated embodiment, it is possible to provide the indication marks and the pointer 15 on the decorative plate and the letter ring, respectively. Furthermore, although the conductive rubber switch 101 and a pair of contacts 84 are used as a switch mechanism associated with the push button 61 in the illustrated embodiment, it is possible to make the conductive rubber switch 101 of an insulative elastic material, so that the contacts are directly opened and closed by the elastic conductive rubber switch 101. The contacts 84 can be replaced with toggle switches.

Although the camera body is used as a part of the switch apparatus in the illustrated embodiment, the switch apparatus can be integrally assembled as a unit. It is possible to apply the switch apparatus to optical equipment or electric equipment other than a camera.

As can be seen from the foregoing, according to the present invention, a rotatable indicating member is external to a device employing the switch apparatus, the operating member, which is effected to rotate the indicating member, is also external to the device, and the push button is mounted to the axis of the indicating member. Thus, a compact compound switch apparatus can be obtained and incorporated in a compact camera without having an adverse influence on the appearance of the camera. Furthermore, the operability of the apparatus is improved since the operating portions are concentrically arranged.

I claim:

1. A switch apparatus useable with a camera, comprising:
    an indicating member affixed to an external surface of the camera, said indicating member being rotatably mounted to an external member which is shaped to conform to a contour of the camera;
    a rotatable operation member located below said external surface of the camera and having an operating portion that is exposed from a side surface of the camera, said rotatable operation member being operated to rotate said indicating member;
    means for producing a first signal representing a rotational position of said rotatable operation member; and
    a push button movable through an opening in said indicating member for producing a second signal.

2. A switch apparatus according to claim 1, wherein said indicating member comprises a letter ring affixed to said external surface of the camera, that is rotatable together with said rotatable operation member.

3. A switch apparatus according to claim 2, wherein said rotatable operation member is rotatably supported in the camera.

4. A switch apparatus according to claim 3, wherein said rotatable operation member has a shaft portion to which said letter ring is fitted.

5. A switch apparatus according to claim 4, wherein said letter ring has an indicating portion on an upper surface of the camera.

6. A switch apparatus according to claim 5, wherein said rotatable operation member includes an opening through which a shaft of said push button extends.

7. The switch apparatus according to claim 6, further comprising a conductive rubber member, said shaft of said push button bearing upon a contact post of said conductive rubber member.

8. The switch apparatus according to claim 7, wherein said push button is elastically held in a projected position by said conductive rubber member.

9. The switch apparatus according to claim 8, further comprising a pair of contacts, wherein said conductive post of said conductive rubber member comes into contact with said pair of contacts when said push button is depressed against an elastic force of said conductive rubber member, establishing an electrical connection between said pair of contacts to produce said second signal.

10. A switch apparatus according to claim 1, further comprising means for stopping said rotatable operation member at a plurality of specific positions.

11. A switch apparatus according to claims 10, wherein said first signal producing means produces data corresponding to said specific positions of said rotatable operation member.

12. A switch apparatus according to claim 11, wherein said first signal producing means comprises a code plate secured proximate said rotatable operation member which rotates together with said rotatable operation member and has a plurality of prearranged conducting land portions, and a plurality of electrical contacts which selectively contact said prearranged land portions.

13. The switch apparatus according to claim 12, wherein said plurality of prearranged conducting land portions form a pattern of conducting annular codes.

14. A switch apparatus according to claim 13, wherein said electrical contacts positioned for sliding contact with said pattern of conducting annular codes.

15. A switch apparatus according to claim 14, wherein said pattern of conducting annular codes comprise conductive land portions and non-conductive portions that selectively contact said plurality of electrical contacts.

16. A switch apparatus, comprising:
    an indicating member;
    a decorative plate having a recess for receiving said indicating member, such that said indicating member is substantially flush with said decorative plate;
    a rotatable operation member positioned proximate a bottom portion of said decorative plate and engaging said indicating member, an operating portion of said rotatable operation member protruding from a side surface of said decorative plate, a rotation of said rotatable operation member rotating said indicating member;
    means for generating a code representing a rotational position of said rotatable operation member; and
    means for selectively producing a signal.

17. The switch apparatus of claim 16, wherein said selective signal producing means comprises a push button switch, and said rotatable operation member includes a hollow shaft portion, said push button switch extending through said hollow shaft portion such that a top portion of said push button switch is proximate a top surface of said decorative plate.

18. The switch apparatus of claim 16, wherein said code generating means comprises:
    a code plate secured to said rotatable operation member to rotate with a rotation of said rotatable operation member, said code plate containing a plurality of circular annular conducting and non-conducting land portions; and
    a plurality of contacts positioned for slidable contact with said conducting and non-conducting land portions to produce a code of a predetermined format representing said rotational position of said rotatable operation member.

19. The switch apparatus of claim 16, further comprising means for stopping said rotatable operation member at a plurality of specific positions.

20. The switch apparatus of claim 16, further comprising means for securing said switch apparatus to a surface of a camera.

* * * * *

UNITED STATES PATENT AND TRADEMARK OFFICE
CERTIFICATE OF CORRECTION

PATENT NO. : 5,369,230
DATED : November 29, 1994
INVENTOR(S) : Masayuki MISAWA

It is certified that error appears in the above-indentified patent and that said Letters Patent is hereby corrected as shown below:

At column 6, line 7 (claim 11, line 1) of the printed patent, "claims" should be changed to ---claim---. This appeared correctly on page 5, line 19 of the amendment as filed on December 9, 1993.

Signed and Sealed this

Twenty-fifth Day of July, 1995

Attest:

BRUCE LEHMAN

*Attesting Officer*        *Commissioner of Patents and Trademarks*